Jan. 18, 1955   R. W. PITMAN ET AL   2,699,846
THERMOSTATIC FLUID BRAKE
Filed April 7, 1950

INVENTORS
RICHARD W. PITMAN
RAPHAEL O. YAVNE

BY

ATTORNEY

_2,699,846_

THERMOSTATIC FLUID BRAKE

Richard W. Pitman and Raphael O. Yavne, Philadelphia, Pa., assignors to the United States of America as represented by the Secretary of the Navy Application April 7, 1950, Serial No. 154,454

1 Claim. (Cl. 188—90)

The present invention relates to fluid couplings or fluid brakes and more particularly to such couplings or brakes having in combination therewith temperature compensating means whereby a substantially uniform torque may be obtained irrespective of variations in viscosity of the fluid due to changes in fluid temperature.

It has been proposed, heretofore, to couple and also to brake or dampen rotating bodies or shafts by the use of a fluid medium interposed between a surface of an impeller member attached to a driving shaft and a corresponding surface of a driven member or stator. The efficiency of such devices is, of course, dependent to a great extent upon the viscosity of the fluid medium used to couple the members and, as is well known, the viscosity of fluids usually used for this purpose is subject to substantial variation due to changes in temperature conditions. When such changes occur in the viscosity of the fluid nonuniform results are obtained.

The present invention avoids the disadvantages that result from variations in temperature in devices of the above-mentioned character by providing compensation for such variations by automatically controlling the size of the space occupied by the fluid medium as the temperature varies.

Hence one object of the present invention is to provide a fluid coupling device wherein a uniform coupling effect is obtained.

Another object of the invention is to provide a device wherein a constant rotational torque may be exerted on a body irrespective of temperature changes that may affect the viscosity of the working fluid.

Another object of the invention is to provide a fluid coupling or brake which is thermostatically controlled so that the drag or braking effect exerted on the body for a given speed will remain substantially constant despite changes in temperature that may affect the viscosity of the fluid.

Another object of the invention is to provide a device of the above type which is compact in design, inexpensive to construct, and which will exert smooth uniform retarding torques on rotating bodies.

Figure 1:
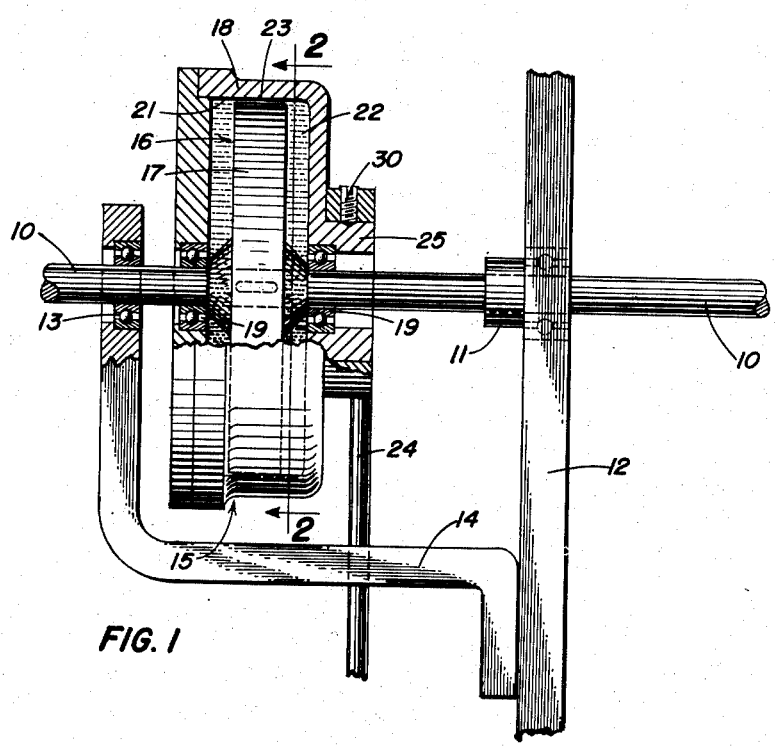
Figure 2:
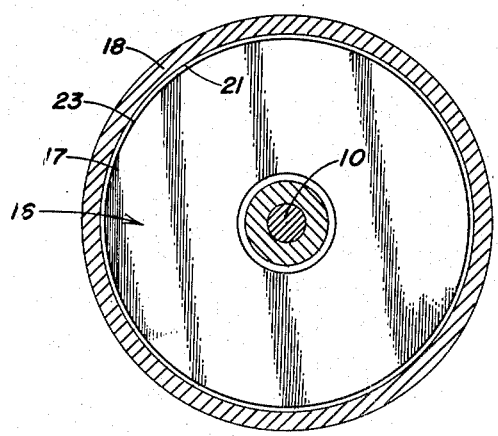

Other objects and their attendant advantages will become apparent in the course of the following detailed description read in conjunction with the accompanying drawing wherein:

Fig. 1 is a side elevation of one embodiment of the present invention with portions thereof broken away; and Fig. 2 is a transverse sectional view taken on a line substantially conforming to line 2—2 of Fig. 1.

In the embodiment shown in the drawing, the present invention is illustrated as it may be applied to a fluid damper or brake for preventing undesirable oscillation or nonuniform torque in a rotating shaft. The numeral 10 designates a single elongated shaft which is journaled at one end in a bearing member 11 mounted in an upright support 12 and at the opposite end in a similar bearing 13 which is mounted on a laterally extending bracket 14 attached to the support 12. Interposed between the left end of bracket 14 and the frame 12 is the fluid brake or couple generally designated 15. Although the embodiment illustrated and described hereinafter is adapted for use as a brake or damper, it is to be understood that only slight modification would be required to adapt the present invention for use as a fluid couple. The device 15 includes a wheel or rotor 16 that is keyed to the shaft 10 for rotational movement therewith and serves as the impeller of the fluid brake or couple. A fluid tight housing 18 corresponding to the stator of a fluid brake surrounds the rotor 16 and is provided with axially aligned bearings 19 which are adapted to journal the shaft 10 so that it may rotate within the housing. The cavity 22 of housing 18 contains a viscous fluid that occupies the space between the rotor 16 and the inner walls of the housing. Escape of such fluid may be avoided by the use of suitable seals or packing material about the shaft as is well known in the art. Constraining means for preventing rotation of the housing may be provided in the form of an arm 24 one end of which is secured by any suitable means such as the set screw 30 to a suitable boss or collar 25 that is integral with the housing as shown. A stop for the arm 24 may be provided by the bracket 14 or, if desired, a suitable torque measuring device (not shown) may be connected to the arm for indicating the drag exerted on the shaft 10.

When the shaft 10 is rotated by any suitable driving means (not shown) the viscous fluid trapped between and adhering to the rim 17 of the rotor 16 and the inner circumference 21 of the stator or housing 18 resists the relative movement of these parts and accordingly the housing or stator tends to follow the rotational movement of the wheel. The constraining arm 24 prevents rotational movement of the housing and the energy that is thereby expended in overcoming the resistance of the fluid causes a braking or retarding effect on the shaft 10. This braking torque can be increased or decreased as desired by varying the annular clearance between the rotor and the stator or by selecting fluids having different viscosity characteristics. It will be apparent that the smaller the clearance or the higher the viscosity of the fluid, the greater will be the retarding torque.

When the rotor 16 is rotated for any appreciable period of time, the friction caused by the constant resistance of the fluid in the cavity 22 will generate a substantial amount of heat which is absorbed by the fluid thus causing its temperature to rise. Since the fluid viscosity decreases as temperature increases it will be apparent that when the shaft has rotated for some time the braking torque exerted by the fluid will become proportionately less. In addition to the friction heat, ambient temperature changes may adversely affect the viscosity of the fluid thereby causing further variations in the braking torque.

In order to compensate for such changes, the present invention contemplates forming the rotor 16 of a material having a relatively high temperature coefficient of expansion such as aluminum or the like and forming the housing 18 of a material having a relatively low or negative temperature coefficient of expansion such as Invar. In order to secure optimum results the material selected preferably should be so correlated with the characteristics of the fluid used that there is provided a constant and uniform torque regardless of changes in the viscosity of the fluid that may occur as a result of changes in temperature. In operation, changes in temperature which affect the viscosity of the fluid will also expand or contract the rotor 16 thereby increasing or decreasing the annular clearance space 23. Thus, after the device has been in operation for a time the heat developed by friction will lower the viscosity of the fluid and as this occurs rotor 16 will expand and decrease the clearance space 23 thereby providing the same braking torque on the shaft 10 through a wide range of temperature variations. The energy required to overcome the resistance of the narrower film of fluid of decreased viscosity is substantially the same as that required to overcome the resistance of the fluid at its initial viscosity, hence, the torque or drag exerted on the shaft will remain constant.

It should be understood, of course, that many variations and modifications of the above-described invention may be resorted to without departing from the scope or the spirit of the appended claim.

What is claimed is:

A damping and braking means for a rotatable shaft comprising; a housing having a large central chamber and shaft admitting openings on opposite sides thereof, a single shaft extending into the openings and through the chamber, a disk-like rotor mounted upon the shaft and rotatable therewith within the housing, means for preventing rotation of the housing, the rotor having substantially smooth side surfaces and a relatively smooth peripheral edge portion, the peripheral edge of the rotor being closely juxtaposed with the inner peripheral wall of the housing to form a friction chamber therebetween and the side surfaces of the rotor being relatively widely spaced away from the corresponding inner wall of the housing to form fluid reservoirs therebetween, the rotor being formed of material having a greater coefficient of expansion than the housing so that molecular friction within the fluid caused by relative movement of the parts will heat and radially expand the rotor to move the peripheral edge thereof into closer juxtaposition with the inner peripheral wall of the housing.

References Cited in the file of this patent

UNITED STATES PATENTS

| | | |
|---|---|---|
| 713,497 | Rowland | Nov. 11, 1902 |
| 1,407,320 | Bouché | Feb. 21, 1922 |
| 1,454,887 | Giovannini | May 15, 1923 |
| 1,881,450 | Fox | Oct. 11, 1932 |
| 1,964,638 | Kreidel | June 26, 1934 |
| 1,969,755 | Kellogg | Aug. 14, 1934 |
| 2,507,182 | Young, Jr. | May 9, 1950 |